March 10, 1936. O. R. CLARK 2,033,683

COMBINATION SINKER AND ANCHOR FOR FISHLINES

Filed Jan. 27, 1934

INVENTOR.
Oscar R. Clark
BY
ATTORNEY.

Patented Mar. 10, 1936

2,033,683

UNITED STATES PATENT OFFICE 2,033,683

COMBINATION SINKER AND ANCHOR FOR FISHLINES

Oscar R. Clark, Temple City, Calif.

Application January 27, 1934, Serial No. 708,663

6 Claims. (Cl. 43—52)

My invention relates to a combination sinker and anchor for fish line and it has among its salient objects to provide a device which can be used as an ordinary sinker and weight is used at the end of a fish line and which also has a new and novel structural feature whereby said device will function as an anchor for holding the line against certain tension when it is desired to take up slack in a line and hold it reasonably taut without moving the device in; to provide a device of the character referred to with forward lower and upper corners adapted to dig into the sand when either of said corners or edges rests in the sand and pull is placed on the line, the line being connected with said device, rearwardly of said front corner or edge, in such a way that the rearward end thereof is raised slightly to more effectively cause the forward edge to bite into the sand and thus retard more effectively the forward movement of said device when pull is placed on the line; to provide a device of the character referred to with openings so arranged that sand and dirt can be moved therethrough by the water and not fill up and clog therein so as to render the device inoperative; to provide a device with means for attaching a fish line at its opposite ends, whereby it can be used as a sinker to be pulled easily along the bottom of the ocean or, the line can be attached so the device will function as an anchor for the line as well as a sinker.

Other objects and advantages will be apparent from the following more detailed description of my invention, taken in connection with the accompanying sheet of drawings illustrating one practical embodiment thereof.

In the drawing, Figure 1 is a view illustrating my device in use;

Figure 1:
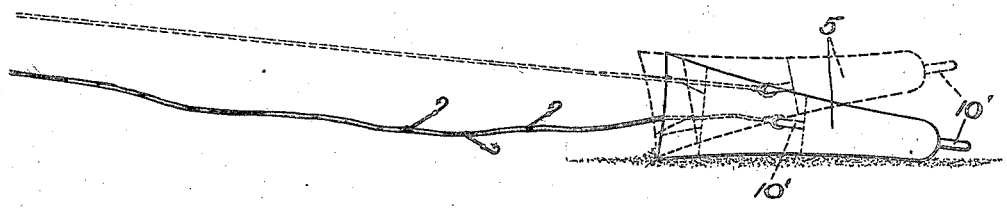
Figure 2:
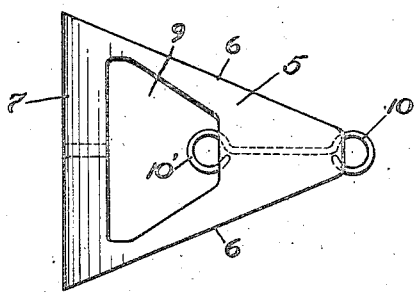
Figure 2 is a top plan view of a device embodying my invention.
Figure 3:
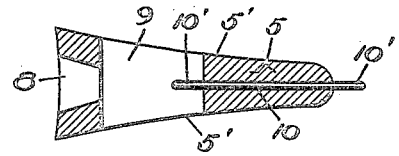
Figure 3 is a longitudinal sectional view through said device.
Figure 4:
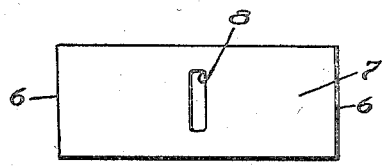
Figure 4 is a front end elevation of said device.

Referring now in detail to the drawing, my invention as here illustrated consists of a body 5, shown to be of tapering form with the opposite tapering sides 6, 6, and the straight front 7, slightly concaved as seen in Figs. 1 and 3, with a vertical slot 8 having tapered sides and located in the middle of said straight front and connecting with an opening 9 formed in the body as clearly seen in Figs. 2 and 3. The top and bottom surfaces of said device are also slightly concaved, as seen at 5', 5', Fig. 3. Moulded in said body 5 is a wire 10 with the line attaching eyes 10' at its opposite ends, whereby the fish line can be attached through the slot 8, to the inner eye, or it can be attached to the other eye at the small end of the device, as will be clear from the showing made.

Referring to Fig. 1, the device is shown with the fish line attached thereto and resting loosely in full lines, and in light broken lines the fish line is pulled taut, and the device is shown slightly raised at its rearward end, whereby the forward lower edge or corner is shown biting more definitely into the sand, shown by the dots. It will be understood that the forward end of the device is much heavier and inasmuch as the fish line is attached toward the rear of the device, pull on said fish line naturally causes the lighter rearward end to rise in the manner indicated by the light broken line position in Fig. 1.

Thus when the fish line is attached through the slot 8 and to the eye in the opening 9, in the body of the device, the device will function not only as a sinker, but as an anchor or holding means for holding the fish line taut when desired. If it is desired to use the device simply as a sinker to be thrown out and then pulled in, the fish line is attached to the eye at the small end of the device, as will be understood from the showing.

It will be understood, of course, that the device is preferably moulded out of lead or other suitable metal and can be made in any size, and it will also be understood that changes in details can be made without departing from the spirit of the invention, and I do not limit the invention to the exact showing made, except as I may be limited by the hereto appended claims.

It will also be seen that the opening 9 through the body 5 makes it possible for any sand and dirt which might otherwise accumulate in the slot 8 to be washed through and out through said opening 9, there being no closed pocket formed therein for sand or other accumulation.

I claim:

1. A fish line anchor consisting of a body having means rearwardly of its forward end for fixedly securing a line thereto, said forward end having a clearance slotway with tapered sides for said line, the forward end of said body being heavier and having its lower side sharp to bite into the sand, whereby pull on said line attaching means causes the line to engage a tapered side of the slotway whereby the lighter rearward end of said body is caused to rise and said lower side to bite into the sand to resist pull.

2. A fish line anchor consisting of a wedge shaped body, the heavier end constituting the forward end and having a vertical slot therethrough, and means for attaching a line to said body rearwardly of said forward end and through said slot, whereby pull on said line attaching means causes the rearward smaller end of said body to rise, said forward heavier end having is ground engaging portion shaped to bite more definitely into the ground as said rearward end is raised.

3. A fish line anchor consisting of a tapering body, tapering rearwardly and having an opening from top to bottom through the body rearwardly of its forward side, line attaching means in the rearward part of said opening, a slotway through the forward end, and a line connected through said slotway to said line attaching means, whereby pull on said line causes the rearward end of said body to rise, said forward heavier side having sharp means adapted to bite into the sand more definitely when said rearward portion of said body is slightly raised.

4. A combination sinker and anchor for fish line consisting of a tapering body, its forward end being the larger and heavier end and having a slotway therein for a fish line, and means rearwardly of its forward larger end for attaching a fish line, whereby when pull is applied thereto said rearward end rises slightly and causes the forward lower part of said body to bite more directly into the sand.

5. A device of the character shown and described and consisting of a tapering body having an opening therethrough from top to bottom and a slot through its front larger end into said first opening, means in the smaller rearward portion of said body in line with said slot for attaching a fish line and means at the rearward smaller end for attaching a fish line, the forward heavier end having sharp corners adapted to bite into the sand when said rearward end is slightly raised.

6. A fish line anchor consisting of a body having its forward end provided with an edge to bite into the sand when its rearward end is raised, and means for attaching the end of a line to said anchor body, said attaching means being rearwardly of said forward end, whereby pull on said line raises said rearward end, said body at its forward end having a clearance opening to permit the relative lateral movement of the line at the forward end of said body as said line raises with the rearward end of said body.

OSCAR R. CLARK.